June 17, 1958 F. A. HESTER 2,839,645

PHOTOCELL STRUCTURE

Filed June 14, 1954

INVENTOR.
FRANK A. HESTER

BY J. B. Burke

ATTORNEY

United States Patent Office 2,839,645

Patented June 17, 1958

2,839,645

PHOTOCELL STRUCTURE

Frank A. Hester, New York, N. Y., assignor to Clairex Corporation, New York, N. Y., a corporation of New York Application June 14, 1954, Serial No. 436,480

8 Claims. (Cl. 201—63)

This invention relates to the art of photosensitive or photoconductive cells and particularly concerns a novel structural assembly for a semi-conductive crystal for forming a rugged, moisture-proof sealed photocell.

Crystals of cadmium sulphide, zinc sulphide, cadmium selenide, cadmium telluride and others respond to the incidence of light rays, X-rays, infra-red rays, corpuscular rays, and other radiant energy rays by increasing their electrical conductivity as a function of the intensity of the incident rays. This physical property is broadly characterized herein as photoconductivity. In order that this physical property may be properly utilized it is necessary to attach suitable electrodes to a crystal for application of an electrical potential to the crystal and to conduct current therethrough. It is also necessary to provide a suitable holder for the crystal and electrode assembly. The photoconductive crystal such as the cadmium sulphide crystal employed in a photocell has a body of the order of a few millimeters in length and less than one millimeter in thickness. This relatively minute body is adversely affected by exposure to contaminating influences such as moisture and dust and to disturbing influences such as mechanical strains, high temperatures and so on. The sensitivity of a photoconductive crystal is reduced or detroyed by these adverse influences and necessitates some effective means to protect the crystal from them. The mounting for the crystal must insulate it from thermal shocks caused when the electrodes which contact the crystal are soldered into an electrical circuit. The mounting must also be substantially transparent to the incident rays directed to the crystal. Complete sealing of the crystal is necessary without at the same time imposing mechanical strains on the crystal.

I have succeeded in accomplishing all of the aforesaid requirements and in avoiding concomitant difficulties by a novel structure which will be described.

It is a principal object of the invention to provide a sealed holder for a semi-conductor crystal which is sensitive to incident rays.

It is a further object to provide a photocell including a cadmium sulphide crystal and connecting electrodes supported in such manner that the crystal is effectively insulated from mechanical and high temperature shocks.

It is a further object to provide a small, simple, moisture-proof, rugged, inexpensive photocell including a photosensitive, semi-conductive crystal, electrodes, and lead wires, suitable for wiring into an electrical circuit.

It is a further object to provide a rigid, light reflecting platform for a crystal, with wire leads electrically connected to the crystal via electrodes which are poor thermal conductors.

Other and further objects and advantages of the invention will become apparent from the following detailed description taken together with the drawing, wherein.

Figs. 6, 7, 8, and 9 show alternative crystal arrangements for obtaining increased sensitivity of the photocell.

Figure 10:
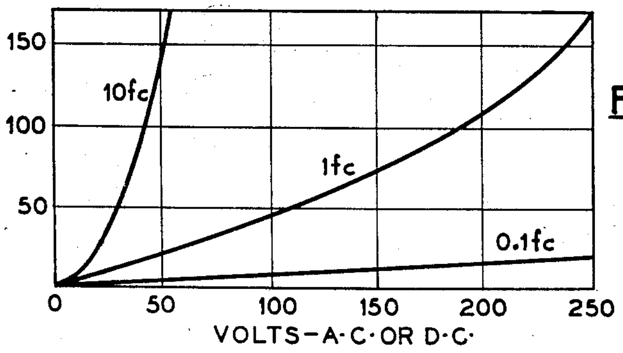

Fig. 10 is a chart showing typical characteristics of a photocell constructed according to the invention.

Figure 4:
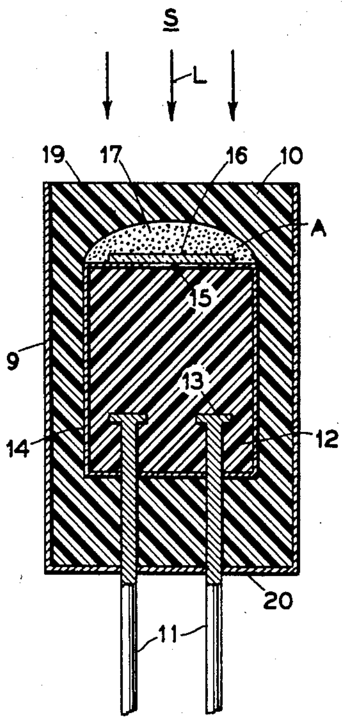
Fig. 4 is a central section in elevation of the photocell shown in Fig. 1.
Figure 1:
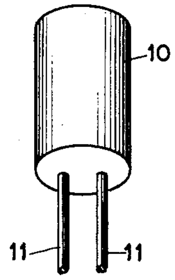
Fig. 1 is a perspective view of a completely assembled photocell according to the invention.

The photocell as shown in Figs. 1 and 4 consists of a cylindrical case 10 of transparent plastic material such as an epoxy resin. Embedded in the case are a pair of wire pins 11. The pins are wire leads which serve as electrical conductors suitable for soldering or otherwise incorporating into an electrical network or circuit. Embedded in the case 10 is a platform member 12 in which the leads terminate. The leads 11 are provided with heads 13 to insure mechanical strength and permanent embedment in the platform.

Figure 2:
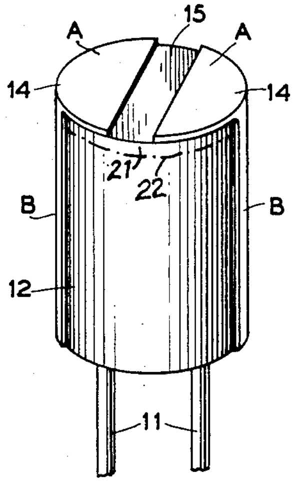
Fig. 2 is an isometric view of a platform with wire leads and electrodes as employed in the invention.
Figure 3:
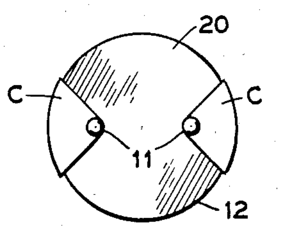
Fig. 3 is a bottom plan view of the platform of Fig. 2.

The platform 12 as shown best in Figs. 2 and 3 is a cylinder of white opaque plastic material of the same type as used for case 10. The same material is preferably used so that shrinkage and expansion of case and platform caused by temperature changes will be uniform throughout the photocell, thus avoiding the imposition of mechanical strains on the crystal described below. Two electrodes 14 are disposed on the platform 12. The electrodes are formed by painting a conductive paste or paint in appropriate patterns on the platform. On top of the platform the electrode areas A are disposed to leave a separating central area 15. The electrodes continue down the sides of the platform as narrow stripes B and then fan out somewhat on the bottom surface 20 of the platform in areas C to contact leads 11. The electrodes 14 are particularly intended to have low thermal conductivity but adequate electrical conductivity. Instead of conductive paste, ink or paint, light wires of some poor heat conductor such as iron may be connected from the leads 11 to two separated points on the top of the platform.

The semi-conductor crystal 16 is placed on the top of the platform in contact with portions of areas A of the electrodes. A resilient buffer member 17 consisting of a mass of waxy material, such as a polymeric material having sufficient viscosity and transparency, is heaped over and around the crystal and on the top of the platform. The wax buffer insures that the crystal remains in perfect electrical contact with both electrodes. The wax buffer is highly viscous but not solid. The plastic consistency of the wax buffer permits only fluid pressures to be transmitted to the crystal from the outer case 10 so that the crystal is effectively insulated from mechanical shocks.

The platform with crystal and wax buffer is encased in the plastic case 10 by any conventional casting process. Epoxy resin may be cast to set cold or hot. In the setting process it contracts very little and the semifluid buffer takes up whatever mechanical strains may tend to occur during the setting of the plastic material. When the crystal 16 is thus encapsulated it is sealed from moisture, dust, heat and mechanical shock. If a high soldering temperature is applied to leads 11 the electrodes serve to insulate the crystal from heat shock because very little heat is transmitted through the thin filamentary strips B to the crystal.

It will be noted that the photocell is arranged for optimum end transmission of light rays to the crystal because both plastic case 10 and buffer 17 are transparent, and the body of the case is painted with an opaque coat 9 with end 19 left clear. The crystal particularly if it be cadmium sulphide is somewhat transparent. Any light which passes through the crystal impinges on and is reflected from the smooth white reflective area 15 back to the crystal to increase the photoconductive effect.

Figure 5:
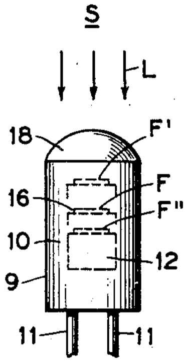
Fig. 5 is an elevational view of a photocell according to the invention with a modified casing.

In Fig. 5 is shown a photocell with a modified form of case. The top portion 18 of the case is spherically curved and being transparent acts as a lens to focus the light rays L on the crystal. The crystal 16 may be located at the focus F of the lens. It is possible to locate the crystal in advance or behind the focus F of the lens such as points F′ or F″ respectively. For a given size of crystal this disposition of the crystal off the focal point F will broaden the field of view although it will lessen somewhat the intensity of incident rays impinging on the crystal.

Figure 6:
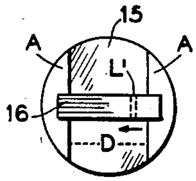
Figure 7:
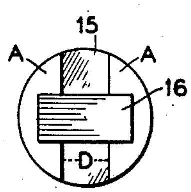

If the photocell and light source S move with respect to each other, the photocell arrangement of Fig. 6 will be desirable. In Fig. 6 the crystal is relatively long compared to its width, and the effective width D of the area 15 on top of the platform is relatively wide as compared with its usual width shown in Fig. 7. Thus the focused light spot L′ can traverse the length of the crystal to increase the photo-conductive effect during the time of travel.

The photocells constructed according to the invention have very high photoconductivity, greater in fact than has hitherto been attainable. The photocell when made with a crystal of cadmium sulphide only a few square millimeters in area can transmit electric currents in response to light rays of many amperes per lumen. A substantial output is obtained in response to X-rays, gamma rays, infra-red rays, and other types of radiant energy. The action of the crystal is one of photoconductivity, the electrical resistance of the crystal being an inverse function of incident light intensity and being extremely high in the absence of light.

In a preferred form the crystal is embedded about ⅛ inch from the top 19 of the transparent plastic cylinder 10. The cylinder is preferably ¼ inch in diameter and ½ inch long. Since the end 19 is clear it provides a window for the entry of light or other rays. The leads 11 may be tinned copper about 1/32 inch in diameter and spaced about 3/32 inch apart. They may extend about 1¾ inches from the end 20 of the cylinder 10. These leads may be used for soldering directly into a circuit or may be cut short and used as pins for mounting in a suitable socket. The dimensions stated are merely given as exemplary, larger or smaller photocells may be constructed by using the principles of construction herein set forth.

Figure 8:
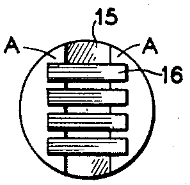

In Fig. 8 is shown a crystal arrangement for increasing the sensitivity of the photocell. A plurality of crystals 16 are disposed in a parallel arrangement to cover more of the separating area 15.

Figure 9:
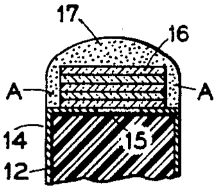

In Fig. 9 is shown another crystal arrangement for increasing the sensitivity of the photocell. A plurality of crystals 16 are piled or stacked one on top of the other in a tandem arrangement and are covered by the transparent wax buffer 17. Since the crystals are semi-transparent, incident rays pass through each of the crystals in succession to reflecting area 15 and back again so that maximum photoconductive effect is derived.

The photocell above described will be found especially useful in application where high output voltage or current is required at low light or other radiation intensity levels. For example, adequate output to fire a cold cathode discharge tube is obtained at a fraction of a foot candle illumination. This output is likewise sufficient to operate directly a meter or electrostatic relay. At high light levels the output is sufficient to operate directly a conventional sensitive magnetic relay.

Typical characteristics of a photocell constructed according to the invention are shown in Fig. 10 in which current flow is plotted against applied voltage for various intensities of illumination. The extremely high sensitivity of the photocell is clearly shown by the several curves. At a light intensity of only 0.1 foot candle about ten microamperes of current flow with an applied voltage of 250 volts A. C. or D. C., and a sensible current flows at a voltage as low as 50 volts, while at 100 foot candles, almost 150 microamperes of current flow at 50 volts. The average photocell will dissipate safely about 50 milliwatts. The effective time constant to modulated light is an inverse function of the incident illumination. At one foot candle average illumination the time constant will be approximately 0.05 second. The dark current conductivity of the photocell is about 0.0005 micromho, that is, at 100 volts applied voltage only 0.05 microampere is passed by the photocell. Thus Fig. 10 shows the substantial increases in conductivity in the presence of incident light rays. Substantial increases in conductivity of the photocell are obtained by incidence of X-rays, infra-red rays, gamma rays, and other types of rays.

A mirror 21 in the form of a disk of glass having a highly reflective surface 22, shown by dotted lines in Fig. 2, may be disposed on the platform 12 beneath the electrode surfaces A and the crystal 16. In this embodiment the photocell will have improved stability and sensitivity at elevated temperatures.

Although a limited number of embodiments of the invention are disclosed herein these are intended only to be illustrative of the invention. Many changes are possible. For example, both the case 10 and platform 12 need not be cylindrical in shape; they may have any other desired geometrical configuration. Other possible changes will readily occur to those skilled in the art without departing from the invention as defined by the scope of the appended claims.

What is claimed and sought to be protected by United States Letters Patent is:

1. A photocell comprising a transparent plastic body, a photoconductive crystal embedded in said body and exposed to rays transmitted through one end of the body, a transparent mass of semifluid material disposed between the crystal and body, a pair of heat resistant electrodes in contact with the crystal, and a plurality of lead wires electrically connected to said electrodes, said mass serving as a buffer to insulate the crystal from mechanical shocks and strains transmitted through the body.

2. A photocell comprising a transparent plastic body, a photoconductive crystal embedded in a transparent mass of semifluid material in said body and exposed to rays transmitted to the body, a platform embedded in the body, and a plurality of heat resistant electrodes in contact with the crystal, said mass serving as a buffer to insulate the crystal from mechanical shocks and strains.

3. A photocell comprising a transparent plastic body, a cadmium sulphide crystal embedded in said body and exposed to rays transmitted through one end of said body, a platform supporting said crystal with heat resistant electrodes therebetween, and a transparent semifluid mass of viscous material disposed between the crystal and said end of the body.

4. A cell sensitive to incident rays comprising a body transparent to said rays, a cadmium sulphide crystal embedded in the body, a rigid platform embedded in the body and heat resistant electrodes in contact with one side of the crystal, and a transparent mass of semifluid material to said rays disposed at the other side of the crystal.

5. A cell having electrical conductivity responsive to the intensity of incident rays, comprising a body having a portion transparent to said rays to define a window, a crystal embedded in said body and disposed to receive said rays, a rigid platform having a ray reflective surface supporting said crystal with heat resistant electrodes therebetween, a mass of semifluid material transparent to said rays disposed between said window and the crystal, and lead wires connected to said electrodes, said electrodes having a heat conductivity characteristic substantially less than that of the lead wires.

6. A cell according to claim 5, wherein said window portion of the body is shaped to define a lens.

7. A cell according to claim 5, wherein said crystal is one of a plurality of crystals arranged in parallel across said electrodes.

8. A cell according to claim 5, wherein said crystal is one of a plurality of crystals stacked in tandem over said electrodes.

References Cited in the file of this patent

UNITED STATES PATENTS

| | | |
|---|---|---|
| 2,001,672 | Carpenter | May 14, 1935 |
| 2,183,256 | Gabler | Dec. 12, 1939 |
| 2,310,365 | Hansell | Feb. 9, 1943 |
| 2,432,303 | Fox | Dec. 9, 1947 |
| 2,659,682 | Anderson | Nov. 17, 1953 |
| 2,668,867 | Ekstein | Feb. 9, 1954 |
| 2,742,550 | Jenness | Apr. 17, 1956 |